United States Patent [19]

Cooley

[11] 4,193,490
[45] Mar. 18, 1980

[54] COLLATING APPARATUS

[75] Inventor: Jack S. Cooley, Atlanta, Ga.

[73] Assignee: The Mead Corporation, Dayton, Ohio

[21] Appl. No.: 908,402

[22] Filed: May 22, 1978

[51] Int. Cl.$^2$ .............................................. B65G 47/04
[52] U.S. Cl. ................................... 198/451; 198/471; 221/289
[58] Field of Search ............... 198/447, 450, 451, 448, 198/425, 449, 491; 221/277, 298, 299, 289

[56] References Cited

U.S. PATENT DOCUMENTS

| 3,176,821 | 4/1965 | Eldred | 198/448 X |
| 3,856,131 | 12/1974 | Flamand | 221/277 X |

FOREIGN PATENT DOCUMENTS

| 1033134 | 6/1958 | Fed. Rep. of Germany | 198/448 |
| 15492 | 3/1903 | Sweden | 221/299 |

*Primary Examiner*—Robert B. Reeves
*Assistant Examiner*—Douglas D. Watts

*Attorney, Agent, or Firm*—Walter M. Rodgers; Walter A. Rodgers

[57] ABSTRACT

Collating apparatus for inserting cubes (C) into a moving row of cylindrical articles (A) for subsequent packaging of groups of the collated articles comprises a screw conveyor (1) having a thread pitch arranged to increase the spacing of cylindrical articles in the direction of movement, an auxiliary conveyor (5) arranged to feed a continuous supply of cubes to the screw conveyor so as to insert the cubes sequentially into the spaces (S) formed between predetermined cylindrical articles together with a rotatable cam (8) having a clearance passage (15) through which cubes from the auxiliary conveyor (5) may move into the line of cylindrical articles, the cam (8) being constructed with a holding portion (12) for preventing movement of a succeeding cube along the auxiliary conveyor during passage of a preceding article through the clearance passage (15) in the cam together with a guide portion (13) for guiding an article from the auxiliary conveyor into a space (S) formed between articles on the screw conveyor (1).

4 Claims, 3 Drawing Figures

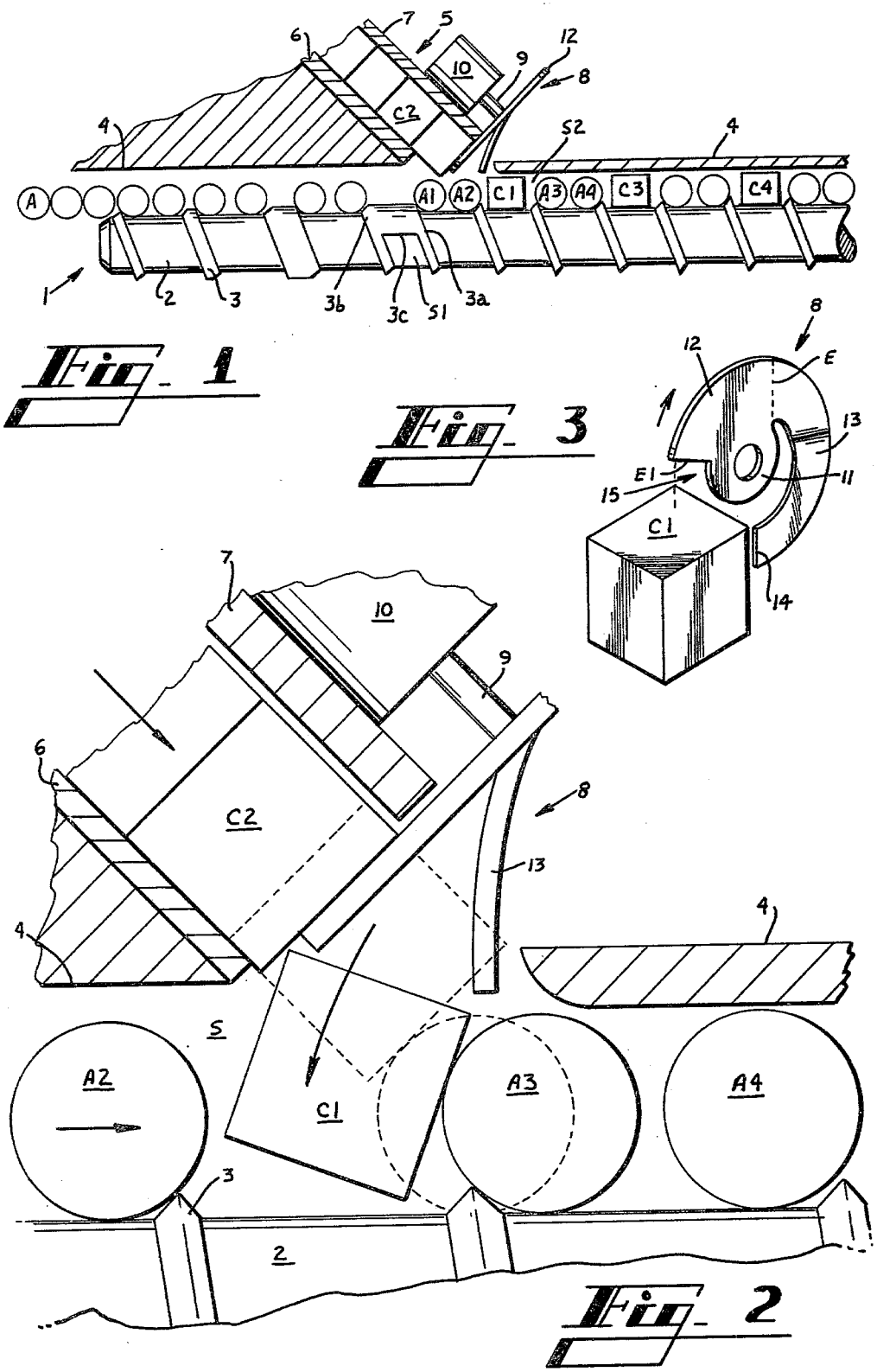

COLLATING APPARATUS

Collating apparatus is known which utilizes a pair of screw conveyors constructed and coordinated in such a way that the articles are moved along a predetermined path by one conveyor and spaced apart in a desired fashion so that articles fed along the other screw conveyor are inserted in sequence into the spaces formed between the articles being moved by the first screw conveyor. Such known apparatus is not suited for use in conjunction with collating procedures which are utilized for collating articles of different configurations.

By this invention articles of cube shape, for example, may be collated with cylindrical articles. The cans A may contain consumer items and the cubes C may contain special promotional items and the like.

This invention in one form may include a conventional screw conveyor having a thread pitch which increases in the direction of article movement so as to establish spaces between predetermined articles such as cylindrically shaped cans, the spaces established between the cylindrically spaced cans being disposed so as to receive articles of a different configuration such as cubes supplied continuously on an auxiliary conveyor together with a rotatable cam disposed at the outlet of the auxiliary conveyor and rotatable synchronously with rotation of the screw conveyor and arranged so as to accommodate movement of an article from the auxiliary conveyor into a space established between adjacent articles on the screw conveyor, the cam being arranged so as to arrest movement of succeeding articles until a subsequent space is established along the screw conveyor and at the outlet end of the auxiliary conveyor. Preferably the rotatable cam comprises a hub portion from which depends a radially extending article holding portion to a side edge of which an axially flared guide portion depends, the outer extremity of the guide portion being spaced from an opposite edge of the holding portion of the cam so as to establish a clearance passage through which an article may move from the auxiliary conveyor into a space established between adjacent articles moving along the screw conveyor.

For a better understanding of the invention reference may be had to the following detailed description taken in conjunction with the accompanying drawing in which FIG. 1 is a schematic overall plan view of the invention in one form;

FIG. 2 is an enlarged view of a portion of FIG. 1 and which depicts the transfer of a cube from the auxiliary conveyor into a space established between adjacent articles on the screw conveyor; and in which FIG. 3 is an enlarged perspective view of a specially constructed cam according to a feature of this invention.

In the drawings the numeral 1 generally designates a screw conveyor comprising a rotatable cylindrical element 2 on which threads 3 are formed together with guide plates 4 spaced to one side of the cylindrical element 2 and its threads 3. Screw conveyor 1 is of conventional construction and the pitch of threads 3 is increased in the direction of movement of the articles A from left to right so as to establish an adequate space between adjacent articles as indicated by the letter S1. As is apparent in FIG. 1, threads 3 become wider in the direction of movement from left to right and the leading edge 3a is separated from the trailing edge 3b at edge 3c to form space S1 therebetween. The articles A are configured in the form of cylinders and may constitute cans used commonly in the packaging of consumer items for example. As is apparent in FIG. 1 space S2 is disposed between article A2 and article A3 and the screw conveyor 1 thus establishes a composite group of articles comprising articles A2, cube C1, and article A3.

For the purpose of continuously supplying articles such as cubes C for insertion into the spaces S provided between articles A, an auxiliary conveyor generally designated by the numeral; 5 is provided. This conveyor could constitute a conventional belt and preferably is arranged to supply the cubes C at a rate somewhat in excess of the rate at which the spaces S are formed along the line of articles A by screw conveyor 1.

Auxiliary conveyor 5 is disposed at an acute angle to screw conveyor 2 and may comprise in addition to the belt (not shown) a pair of guide plates 6 and 7 between which the cubes C are moved in sequence one behind the other.

For controlling and metering the flow of cubes C into the spaces S, a specially constructed cam generally designated by the numberal 8 is provided according to one aspect of this invention. Cam 8 is mounted on rotatable shaft 9 driven in a clockwise direction as viewed in FIG. 3 by any suitable means such as motor 10. Of course motor 10 must be driven in synchronism with screw conveyor 1.

Cam 8 includes a central hub portion designated by the numeral 11 from which depends a holding portion designated by the numeral 12 which preferably is substantially flat and from an edge E of which a guide portion 13 depends. As in apparent particularly from FIGS. 2 and 3, guide portion 13 is flared outwardly in an axial direction and is disposed in partially enveloping relation with respect to hub 11. The edge designated E is an imaginary designation and simply defines the junction between holding portion 12 and guide portion 13.

Disposed between the opposite edge E1 of holding portion 12 and the outer extremity 14 of guide portion 13 is a clearance passage generally designated by the numeral 15. As is apparent particularly in FIGS. 2 and 3, the cube such as C1 passes through the clearance passage 15 during its movement from the auxiliary conveyor 5 and into the space S formed by the screw conveyor 1. During movement of cubes such as C1 from the auxiliary conveyor 5 into the space S, the cube is guided by guide portion 13. Furthermore as is apparent particularly from FIG. 2, a succeeding cube such as C2 is engaged and held on the auxiliary conveyor 5 by the holding portion 12 of cam 8 until a suitable space S is established.

Once the articles A and the cubes C are collated as indicated at the right hand portion of FIG. 1, for example, the articles may then be acumulated in groups such for example as groups of two cans such as A2 and A3 one one cube such as C1. Such groups may then be disposed in a unitary package which could take the form of an open ended wrapper disposed about the articles and forming a one line row thereof.

Obviously different arrangements of articles could be provided and any modification of the screw conveyor or of the speed of rotation of cam 8 could be effected so as to establish any desired collated arrangement.

The embodiments of the invention in which an exlusive property or privilege is claimed are defined as follows:

1. Collating apparatus for inserting cubes into a moving row of cylindrical articles, said apparatus comprising a screw conveyor arranged to receive cylindrical articles and having a thread pitch which increases in the direction of article movement so as to establish spaces between predetermined articles, an auxiliary conveyor disposed at an acute angle to said screw conveyor and arranged to feed a continuous supply of cubes to said screw conveyor, the outfeed end of said auxiliary conveyor being disposed adjacent the part of said screw conveyor at which said spaces are sufficiently large to accommodate entry of a cube thereinto, and a movable cam disposed adjacent the outfeed end of said auxiliary conveyor and arranged to accommodate synchronous movement of a cube into the adjacent one of said spaces, said cam being rotatable and being provided with a guide portion for facilitating entry of a cube into one of said spaces and said cam being provided with a holding portion for engaging and holding a cube against movement along said auxiliary conveyor during entry of a preceding cube into one of said spaces and said cam being provided with a clearance passage between said holding portion and said guide portion which accommodates movement of a cube off of said auxiliary conveyor while a succeeding cube is in engagement with said holding portion of said cam.

2. Collating apparatus according to claim 1 wherein said cam includes a hub portion and wherein said holding portion depends from said hub portion and projects radially outward therefrom.

3. Collating apparatus according to claim 1 wherein said guide portion depends from one side edge of said holding portion so as partially to envelope said hub portion and is axially flared out of the plane of said holding portion for engaging and guiding movement of a cube from said auxiliary conveyor into one of said spaces.

4. Collating apparatus according to claim 1 wherein the outer extremity of said guide portion is spaced from a side edge of said holding portion to define said clearance passage.

* * * * *